(12) United States Patent
Li (10) Patent No.: US 7,173,773 B1
(45) Date of Patent: Feb. 6, 2007

(54) WHOLE GROUP FOCUSING STRUCTURE

(75) Inventor: Min-Che Li, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/306,890

(22) Filed: Jan. 13, 2006

(51) Int. Cl.
*G02B 15/14* (2006.01)
(52) U.S. Cl. ..................... 359/701; 359/704
(58) Field of Classification Search ............... 359/694, 359/696, 700, 701, 704
See application file for complete search history.

(56) References Cited

U.S. PATENT DOCUMENTS 6,049,432 A * 4/2000 Machida et al. ............ 359/700

2002/0093745 A1 * 7/2002 Takanashi et al. .......... 359/696
2004/0196573 A1 * 10/2004 Nomura et al. ............. 359/701

* cited by examiner

*Primary Examiner*—Ricky Mack
*Assistant Examiner*—Darryl J. Collins
(74) *Attorney, Agent, or Firm*—Banger Shia (57) ABSTRACT

A whole group focusing structure comprises a lens track cylinder, a first lens group, a second lens group, and a drive motor is used to rotate and move the lens track cylinder, so as to carry out focus between the first and second lens groups. A slant parallel section is formed in each of the two guiding tracks at the end of the guiding block, and the slant parallel section is used to perform focus. The whole group focusing structure only needs a set of drive and control system to perform focus and zoom, therefore, the present invention is a high quality whole group focusing structure that can meet market needs.

5 Claims, 6 Drawing Sheets

WHOLE GROUP FOCUSING STRUCTURE

BACKGROUND OF THE INVENTION

1. Field of the Invention

The present invention relates to a lens barrel, and more particularly to a whole group focusing structure capable of performing focus and zoom, the whole group focusing structure is not only small and low cost, but also has good zooming and focusing effect.

2. Description of the Prior Art

Since the image taking lens assembly has an increasingly wide range of application, particularly for the mobile phone, the image taking has become one of the necessary functions. Nowadays, a mobile phone is usually equipped with a solid image sensor and an image taking lens assembly, such as CCD sensor (charge coupled device) or CMOS sensor (Complementary Metal Oxide Semiconductor). To comply with the requirement of miniaturizing the solid image sensor and the image taking lens assembly as well as improving the performance thereof, four-piece lens assembly in the products needs to be miniaturized and its performance thereof also needs to be improved. Therefore, with the popularization of photographic mobile phone, the research and development of the whole group focusing structure is becoming more and more urgent. Hence, how to develop a whole group focusing structure more satisfying the user's requirements has become an important consideration of the manufacturer.

U.S. Pat. No. 6,369,956 published on Apr. 9, 2002 discloses a two group zoom lens barrel that comprises a plurality of rotary cylinders and linear movement cylinders, two lens groups are connected to different linear movement cylinders. The rotary cylinders drive the linear cylinders to move in the direction of the optical axis, so as to change the distance between the two lens groups. This type zoom lens barrel is simple and small, however, it still has the following problems:

This conventional two group zoom lens barrel utilizes tracks to change the distance between the linear movement cylinders, when a predetermined zooming position is reached, the lenses in different linear movement cylinders are affected by the factors of light, angle, temperature, distance and refraction, the two lens groups in different linear movement cylinders are not at optimum focus position. This conventional two group zoom lens barrel only can focus at predetermined positions and is unable to perform more precise focusing operation. Therefore, such structure still has problem in image quality.

In view of this, currently a three group lens barrel appears on the market, which is formed by adding a third lens group at the rear of the two group zoom lens barrel, and a second drive motor is used to move the third lens group by cooperating with a focal length sensing and controlling system. When the two group zoom lens barrel is zoomed and positioned, the displacement of the third lens group can make the conventional focus point more accurate. Although the abovementioned technology can refocus after zooming operation, it still has the following problems:

Firstly, the zoom mechanism of such three group lens barrel must control three lens groups, therefore it is large and complicated.

Secondly, such three group lens barrel has two sets of control system and two drive motors, the two drive motors not increase the cost but also are difficult to be controlled.

Furthermore, zooming and focusing operation of this lens barrel are controlled separately, so it is much more difficult than conventional controlling methods.

The present invention has arisen to mitigate and/or obviate the afore-described disadvantages.

SUMMARY OF THE INVENTION

The primary objective of the present invention is to provide a whole group focusing structure that has focusing and zoom function.

The whole group focusing structure comprises a lens track cylinder, a first lens group, a second lens group and a drive motor. The drive motor is used to move the lens track cylinder, so as to carry out focus between the first and second lens groups. A slant parallel section is formed in the guiding tracks at the end of the guiding block, and the slant parallel section is used to micro adjust the focal length by moving the first and second lens groups back and forth. The present invention only needs a set of drive and control system to perform focus and zoom, therefore, the present invention is a high quality whole group focusing structure that can meet market needs.

Another objective of the present invention is to provide a whole group focusing structure is small and low cost by forming slant parallel section in the guiding tracks at the end of the guiding block, and zooming and focusing can be carried out only by using a set of drive and control system, without requiring many complicated structures, thus the cost and volume of the hole group focusing structure can be reduced substantially.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying drawings.

Referring to FIGS. 1–5, a whole group focusing structure in accordance with a first embodiment of the present invention is illustrated and comprises a lens track cylinder 10, a guiding cylinder 20, a first lens group 30, a second lens group 40 and a drive motor (not shown). The first lens group 30 and the second lens group 40 are arranged sequentially from the object side. The whole group focusing structure is explained as follows:

The lens track cylinder 10 is formed in its periphery with at least two hollow guiding tracks 11 and at least one hollow positioning track 12. In each of the two hollow guiding tracks 11 is formed a transition section 111, and the transition sections 111 are symmetrically arranged in the axial direction of the lens track cylinder 10, and a slant parallel section 112 is formed at the end of each of the two hollow guiding tracks 111 and arranged in the axial direction of the lens track cylinder 10. The hollow positioning track 12 is annularly arranged between the two hollow guiding tracks 111 and located correspondingly to the axial center of the lens track cylinder 10.

The guiding cylinder 20 is received in the lens track cylinder 10. The guiding cylinder 20 is provided on its periphery with guiding-cylinder guiding members 21 that are confined in the hollow positioning track 12 of the lens track cylinder 10. A first axial elongated aperture 211 and a second axial elongated aperture 212 are formed at both sides of the guiding-cylinder guiding members 21. The first axial elongated aperture 211 and the second axial elongated aperture 212 correspond to the two opposite hollow guiding tracks 111 of the lens track cylinder 10, respectively.

The first lens group 30 is interiorly provided with predetermined lenses and is received in the guiding cylinder 20. A first guiding member group 31 is installed on the periphery of the first lens group 30 and is inserted and confined in one of the hollow guiding tracks 11 in the periphery of the lens track cylinder 10 after passing through the first axial elongated aperture 211 of the guiding cylinder 20.

The second lens group 40 is provided with predetermined lenses and is received in the guiding cylinder 20. A second guiding member group 41 is installed on the periphery of the second lens group 40 and is inserted and confined in another one of the hollow guiding tracks 11 in the periphery of the lens track cylinder 10 after passing through the second axial elongated aperture 212 of the guiding cylinder 20.

The drive motor (not shown) serves to move the lens track cylinder 10 and moves according to predetermined program.

For a better understanding of the first embodiment, reference should be made to FIGS. 1–5. Due to the first lens group 30 is provided on its periphery with the first guiding member group 31, and the guiding member group 31 is installed on the periphery of the first lens group 30 and is inserted and confined in one of the hollow guiding tracks 11 in the periphery of the lens track cylinder 10 after passing through the first axial elongated aperture 211 of the guiding cylinder 20. And the second guiding member group 41 of the first lens group 30 is inserted and confined in another one of the hollow guiding tracks 11 in the periphery of the lens track cylinder 10 after passing through the second axial elongated aperture 212 of the guiding cylinder 20.

When the drive motor moves the lens track cylinder 10, the two hollow guiding tracks 11 formed in the periphery of the lens track cylinder 10 will utilizes the transition section 111 to cause axial displacement of the first guiding member group 31 of the first lens group 30 and the second guiding member group 41 of the second lens group 40. In this way, the distance between the first and second lens groups 30 and 40 is changed, and the primary zooming effect of the present invention is achieved. At this moment, the allowable displacement of the second guiding member group 41 passing through the second axial elongated aperture 212 of the guiding cylinder 20, and the allowable displacement of the first guiding member group 31 passing through the first axial elongated aperture 211 of the guiding cylinder 20, will allow the first lens group 30 and the second lens group 40 to move freely, thus changing the focal length.

In addition, the guiding cylinder 20 is provided on its periphery with the guiding-cylinder guiding members 21 that are confined in the hollow positioning track 12 of the lens track cylinder 10, and the hollow positioning track 12 of the lens track cylinder 10 is located between the two hollow guiding tracks 11. Therefore, the relative rotation between the guiding cylinder 20 and the lens track cylinder 10 will not lead to an axial displacement therebetween, and it also can stabilize the adjustment between the first lens group 30 and the second lens group 40.

The most important characteristics of the present invention lie in that:

Each of the two hollow guiding tracks 11 is formed at an end thereof with a slant parallel section 112, the first guiding member group 31 is inserted and confined in one of the hollow guiding tracks 11 in the periphery of the lens track cylinder 10, and the second guiding member group 41 is inserted and confined in another one of the hollow guiding tracks 11. When the two hollow guiding tracks 111 of the lens track cylinder 1 0 drive the first guiding member group 31 and the second guiding member group 41 to move through the transition 111 (this embodiment is designed such that the drive motor will not stop in the transition section 111). The distance between the first lens group 30 and the second lens group 40 will keep unchanged within the slant parallel section 11 2. However, the drive motor can use the two opposite hollow guiding tracks 111 to simultaneously move the first guiding member group 31 and the second guiding member group 41 back and forth (still maintaining the distance).

By such arrangements, the drive motor of the present invention can perform focusing within the slant parallel section 112, using the same drive motor, the same control system and rotating the same element. Therefore, the present invention not only has zoom and focus function, but also is small and low cost.

Figure 1:
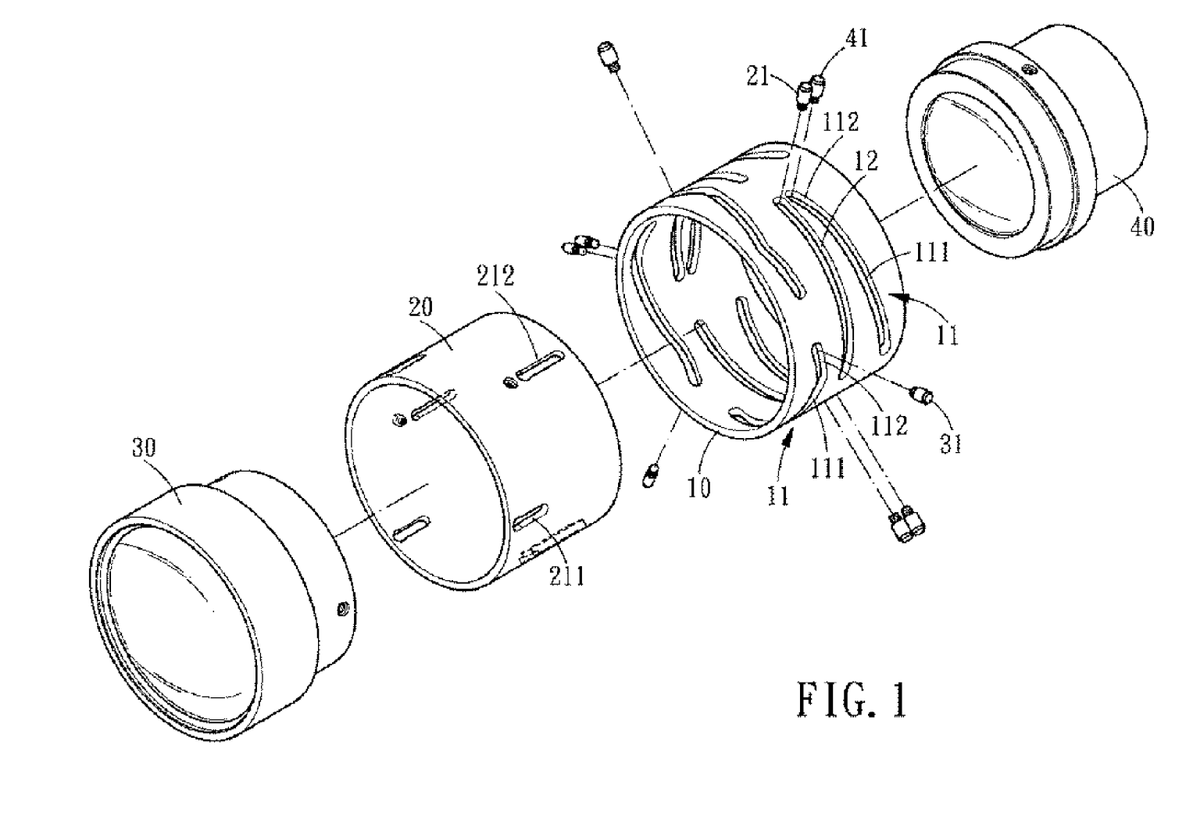
FIG. 1 is an exploded view of a first embodiment of the present invention.
Figure 2:
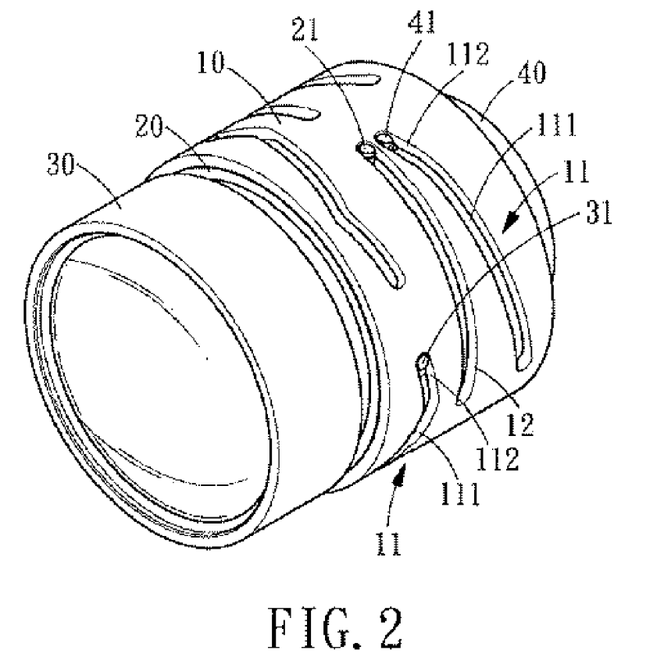
FIG. 2 is an assembly view of the first embodiment of the present invention.
Figure 3:
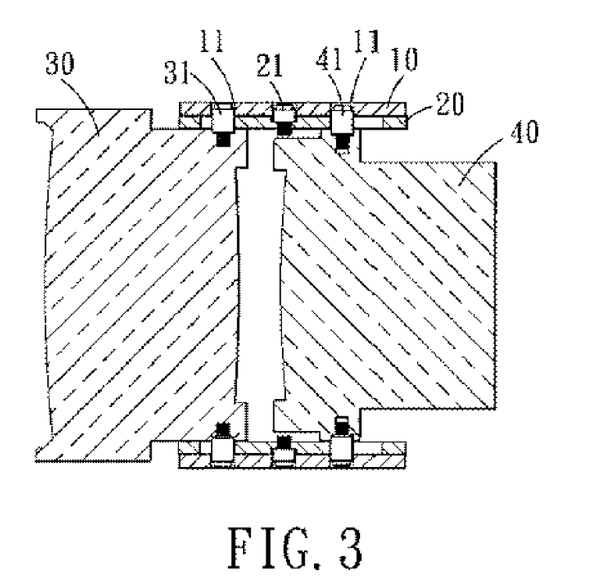
FIG. 3 is a cross section view of the first embodiment of the present invention.
Figure 4:
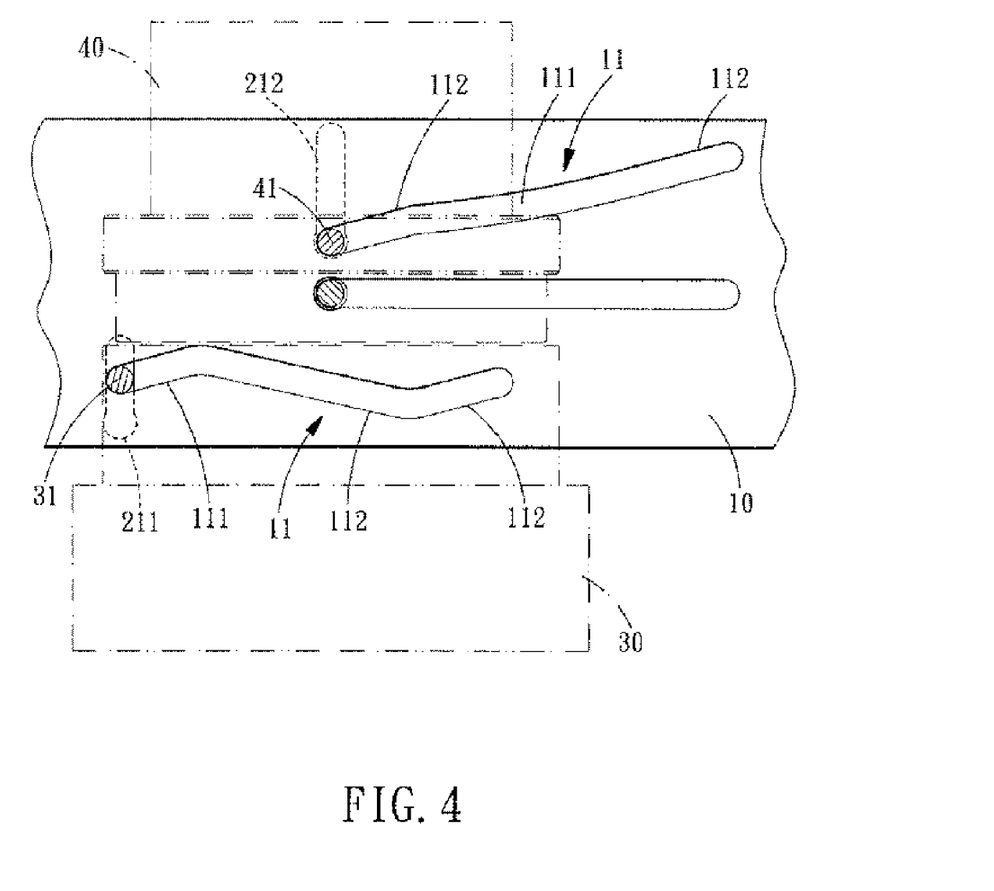
FIG. 4 is an illustrative view of showing that the lens track cylinder of the first embodiment is being opened up.
Figure 5:
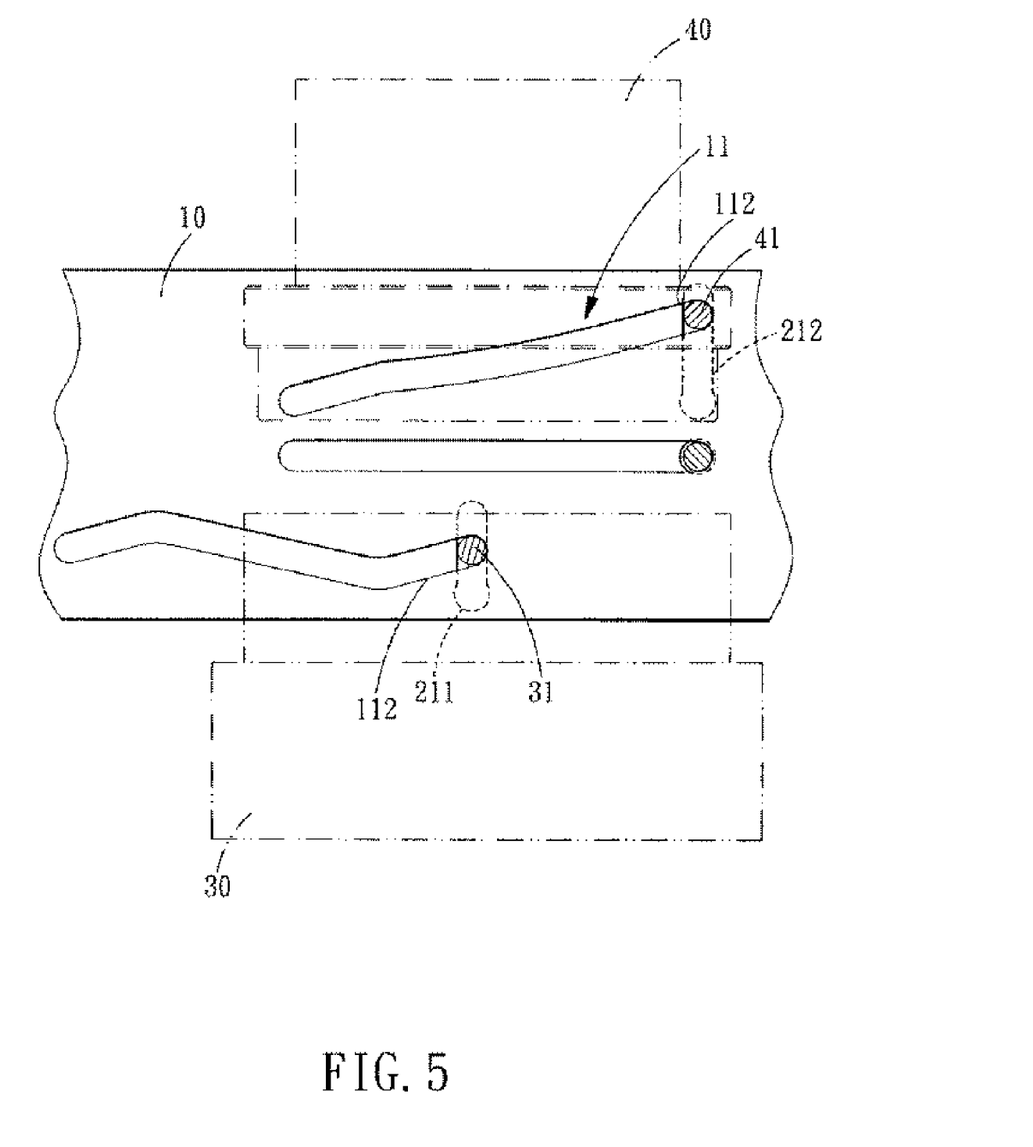
FIG. 5 is an illustrative view of showing that the lens track cylinder of the first embodiment is being opened up.
Figure 6:
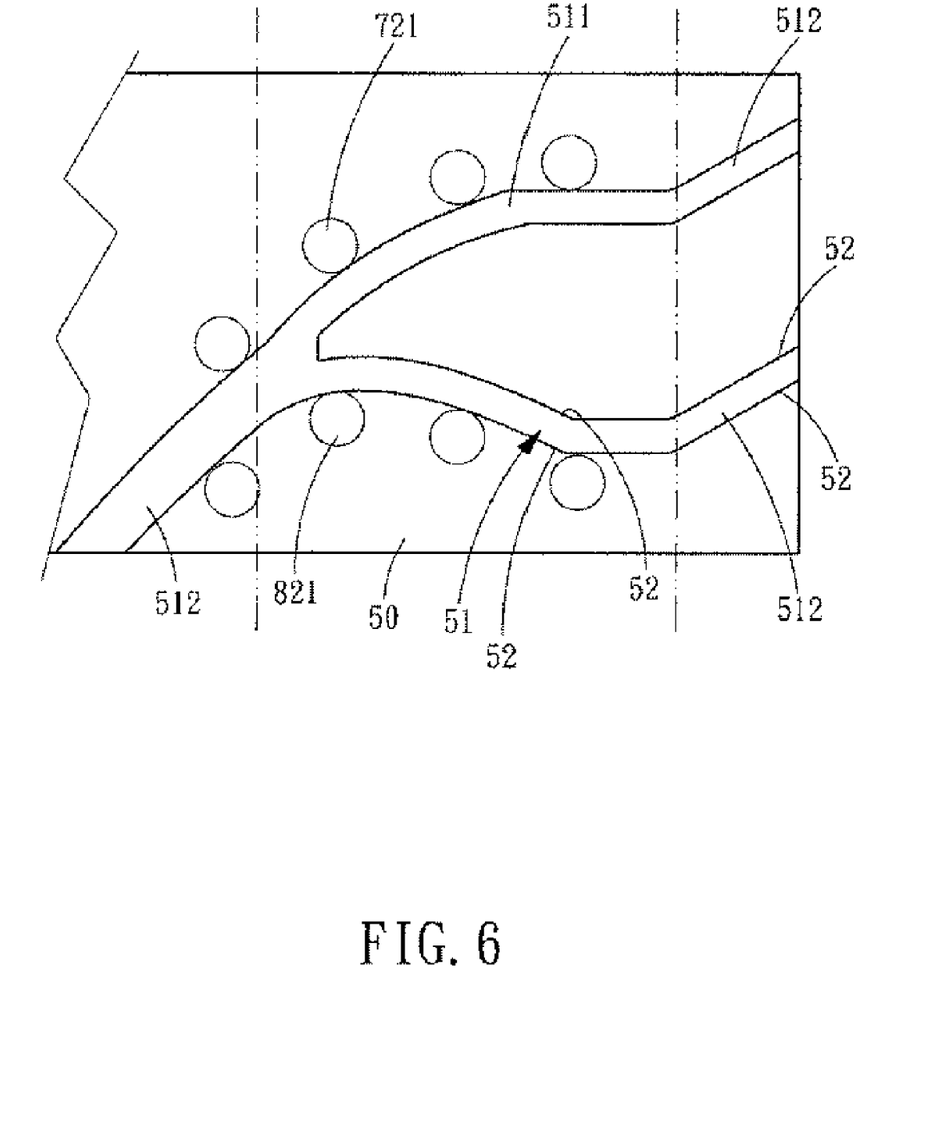
FIG. 6 is an illustrative view of showing that the lens track cylinder of a second embodiment is being opened up.
Figure 7:
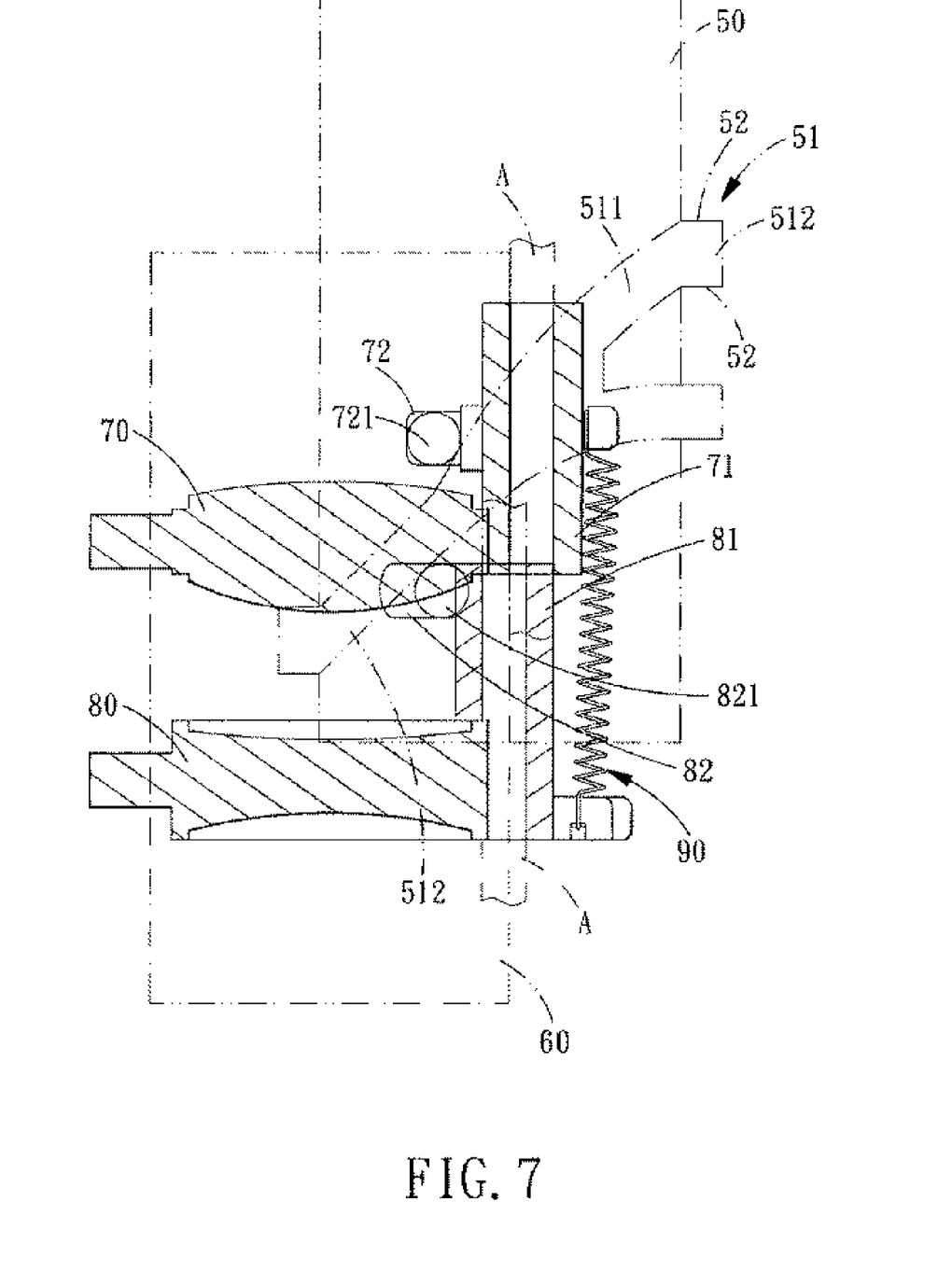
FIG. 7 is an assembly view of the second embodiment.

Referring to FIGS. 6 and 7, a whole group focusing structure in accordance with a second embodiment of the present invention is illustrated and comprises a lens track cylinder 50, a guiding cylinder 60, a first lens group 70, a second lens group 80, an elastic member 90 and a drive motor (not shown).

The lens track cylinder 50 is formed on its periphery with guiding block 51, a guiding track 52 is located at either side of the guiding block 51. In the guiding block 51 is formed a transition section 511 for changing the distance between the two guiding tracks 52. A slant parallel section 512 is formed in each of the two guiding tracks 52 at the end of the guiding block 51.

The guiding cylinder 60 is positioned at a side of the lens track cylinder 50, and two sliding shafts A are disposed beside the guiding cylinder 60.

The first lens group 70 is slideably received in the guiding cylinder 60 and is arranged at a side thereof with a protruding positioning member 71. A guiding member 72 having a sliding wheel 721 is installed on the positioning member 71. The positioning member 71 can slide freely in the axial direction of one of the sliding shafts A. The guiding member 72 abuts against the guiding track 52 at a side of the guiding block 51 of the lens track cylinder 50 by using the sliding wheel 721.

The second lens group 70 is slideably received in the guiding cylinder 60 and is arranged at a side thereof with a protruding positioning member 81. A guiding member 82 having a sliding wheel 821 is installed on the positioning member 81. The positioning member 81 can slide freely in the axial direction of another one of the sliding shafts A. The guiding member 82 abuts against the guiding track 52 at another side of the guiding block 51 of the lens track cylinder 50 by using the sliding wheel 821.

The elastic member 90 has two ends positioned on the first lens group 70 and the second lens group 80, respectively, so that the elastic member 90 expands and retracts between the first lens group 70 and the second lens group 80, providing a predetermined force for making the first lens group 70 and the second lens group 80 approach each other. Since the guiding member 72 abuts against the guiding track 52 at a side of the guiding block 51 of the lens track cylinder 50 by using the sliding wheel 721, and the guiding member 82 abuts against the guiding track 52 at another side of the guiding block 51 of the lens track cylinder 50 by using the sliding wheel 821. When the drive motor moves the lens track cylinder 50, the guiding block 51 of the lens track cylinder 50 will use the transition section 511 between the two guiding track 52 to cause axial displacement between the first lens group 70 and the second lens group 80, and thus the primary zooming function of the present invention is achieved.

At this moment, the two sliding shafts A beside the guiding cylinder 60 can restrict the radial movement of the first lens group 70 and the second lens group 80 while allowing them to move freely in axial direction, so as to change the focal length.

In addition, the elastic member 90 provides a force for enabling the first lens group 70 and the second lens group 80 to approach each other, therefore, the guiding members 72 and 82 will keep abutting against the guiding track 52 of the guiding block 51 of the lens track cylinder 50.

The most important characteristics of the second embodiment lie in that:

A slant parallel section 512 is formed in each of the two guiding tracks 52 at the end of the guiding block 51. When the two guiding tracks 52 of the lens track cylinder 50 drive the guiding members 72 and 82 to move through the transition section 511, the distance between the first lens group 70 and the second lens group 80 will keep unchanged within the slant parallel section 512. However, the drive motor can use the slant parallel section 512 of the two opposite guiding tracks 52 to simultaneously move the first guiding member group 70 and the second guiding member group 80 back and forth (still maintaining the distance). By such arrangements, the drive motor of the present invention can perform focusing within the slant parallel section 512, using the same drive motor, the same control system and rotating the same element. Therefore, the present invention not only has zoom and focus function, but also is small and low cost.

As stated above, the innovative design of this invention is the use of whole group focusing structure that comprises a lens track cylinder, a first lens group, and a second lens group. A drive motor rotates and moves the lens track cylinder, so as to carry out focus between the first and second lens groups. A slant parallel section is formed in each of the two guiding tracks at the end of the guiding block, and the slant parallel section is used to perform focus. Therefore, the present invention not only has zoom and focus function, but also is small and low cost.

While we have shown and described various embodiments in accordance with the present invention, it should be clear to those skilled in the art that further embodiments may be made without departing from the scope of the present invention.

What is claimed is:

1. A whole group focusing structure comprising: a lens track cylinder, a first lens group, a second lens group and a drive motor, the first lens group and the second lens group being arranged sequentially from the object side; wherein
    at least hollow two guiding tracks are formed in an periphery of the lens track cylinder, a transition section formed in each of the hollow guiding tracks, and the transition sections being symmetrically arranged in an axial direction of the lens tracking cylinder, and a slant parallel section is formed at the end of each of the two guiding tracks and arranged in an axial direction of the lens track cylinder;
    the first lens group is provided with predetermined lenses and guiding member, and the guiding member is confined in one of the guiding tracks in the periphery of the lens track cylinder;
    the second lens group is provided with predetermined lenses and guiding member and is positioned correspondingly to the first lens group, the guiding member is confined in another one of the guiding tracks in the periphery of the lens track cylinder; and
    the drive motor serves to move the lens track cylinder.

2. The whole group focusing structure as claimed in claim 1 further comprising a guiding cylinder; wherein the lens track cylinder is formed in its periphery with at least two hollow guiding tracks and at least one hollow positioning track, the transition sections in the two hollow guiding tracks are symmetrically arranged in the axial direction of the lens track cylinder, and a slant parallel section is formed at the end of each of the two hollow guiding tracks and arranged in the axial direction of the lens track cylinder, the hollow positioning track is annularly arranged between the two hollow guiding tracks and located correspondingly to an axial center of the lens track cylinder;
    the guiding cylinder is received in the lens track cylinder, guiding-cylinder guiding member is arranged on an periphery of the guiding cylinder and is confined in the hollow positioning track of the lens track cylinder, a first axial elongated aperture and a second axial elongated aperture are formed at both sides of the guiding-cylinder guiding members, the first axial elongated aperture and the second axial elongated aperture correspond to the two opposite hollow guiding tracks of the lens track cylinder, respectively;
    the first lens group is received in the guiding cylinder, and the guiding member of the first lens group is inserted and confined in one of the hollow guiding tracks in the periphery of the lens track cylinder after passing through the first axial elongated aperture of the guiding cylinder;
    the second lens group is received in the guiding cylinder, the guiding member of the second lens group is inserted and confined in another one of the hollow guiding tracks in the periphery of the lens track cylinder after passing through the second axial elongated aperture of the guiding cylinder.

3. The whole group focusing structure as claimed in claim 2, wherein the guiding members are detachably installed on the first and second lens groups by screwing method.

4. The whole group focusing structure as claimed in claim 1 further comprising a guiding cylinder and an elastic member, wherein the lens track cylinder is formed on its periphery with guiding block, a guiding track is located at either side of the guiding block, in the guiding block is formed a transition section for changing a distance between the two guiding tracks, a slant parallel section is formed in each of the two guiding tracks at the end of the guiding block;

the guiding cylinder is positioned at a side of the lens track cylinder, and two sliding shafts are disposed beside the guiding cylinder;

the first lens group is slideably received in the guiding cylinder and is arranged at a side thereof with a protruding positioning member, a guiding member having a sliding wheel is installed on the positioning member, the positioning member can slide freely in the axial direction of one of the sliding shafts, the guiding member abuts against the guiding track at a side of the guiding block of the lens track cylinder by using the sliding wheel;

the second lens group is slideably received in the guiding cylinder and is provided at a side thereof with a protruding positioning member, a guiding member having a sliding wheel is installed on the positioning member, the positioning member can slide freely in the axial direction of another one of the sliding shafts, the guiding member abuts against the guiding track at another side of the guiding block of the lens track cylinder by using the sliding wheel; and the elastic member has two ends positioned between the first lens group and the second lens group for providing a predetermined force for making the first lens group and the second lens group approach each other.

5. The whole group focusing structure as claimed in claim 4, wherein the elastic member is a tension spring having two ends positioned between the first lens group and the second lens group.

\* \* \* \* \*